(12) United States Patent
Ul Karim et al.

(10) Patent No.: US 6,748,745 B2
(45) Date of Patent: Jun. 15, 2004

(54) MAIN BURNER, METHOD AND APPARATUS

(75) Inventors: Md. Hasan Ul Karim, Hamden, CT (US); Kent Lyle, Stanford, CA (US); Lance L. Smith, North Haven, CT (US); Shahrokh Etemad, Trambull, CT (US); William C Pfefferle, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 0 days.

(21) Appl. No.: 09/953,122

(22) Filed: Sep. 15, 2001

(65) Prior Publication Data

US 2003/0054304 A1 Mar. 20, 2003

(51) Int. Cl.$^7$ ................................................. F23R 3/40
(52) U.S. Cl. ............................... 60/777; 60/723; 431/7; 431/326
(58) Field of Search ..................... 60/723, 777; 431/7, 431/170, 326

(56) References Cited

U.S. PATENT DOCUMENTS

| | | | |
|---|---|---|---|
| 4,432,207 A | * 2/1984 | Davis et al. | 60/723 |
| 4,459,126 A | * 7/1984 | Krill et al. | 431/7 |
| 4,766,721 A | 8/1988 | Iizuka et al. | |
| 5,069,029 A | 12/1991 | Kuroda et al. | |
| 5,165,224 A | * 11/1992 | Spadaccini et al. | 60/780 |
| 5,235,804 A | * 8/1993 | Colket et al. | 60/780 |
| 5,318,436 A | 6/1994 | Colket, III et al. | |
| 5,431,017 A | * 7/1995 | Kobayashi et al. | 60/723 |
| 5,452,574 A | * 9/1995 | Cowell et al. | 60/39.23 |
| 5,623,819 A | 4/1997 | Bowker et al. | |
| 5,636,511 A | * 6/1997 | Pfefferle et al. | 60/723 |
| 5,640,851 A | 6/1997 | Toon et al. | |
| 5,974,781 A | 11/1999 | Correa et al. | |
| 6,105,360 A | 8/2000 | Willis | |
| 6,174,159 B1 | * 1/2001 | Smith et al. | 431/7 |
| 6,339,925 B1 | * 1/2002 | Hung et al. | 60/777 |
| 6,358,040 B1 | * 3/2002 | Pfefferle et al. | 431/7 |
| 6,394,791 B2 | * 5/2002 | Smith et al. | 431/7 |

* cited by examiner

Primary Examiner—Ted Kim
(74) Attorney, Agent, or Firm—McCormick, Paulding & Huber LLP

(57) ABSTRACT

The invention is a method and apparatus for use therewith for a main burner of a gas turbine. The method employs catalytic combustion to support main combustion. More specifically, a rich fuel/air mixture is catalytically oxidized with the resulting reacted mixture being made lean by having additional air added thereto. The resulting lean mixture is then combusted in the presence of the main mixture that is also lean thereby supporting combustion of the main mixture. The method allows for enhanced turndown of a lean main mixture.

24 Claims, 2 Drawing Sheets

MAIN BURNER, METHOD AND APPARATUS

FIELD OF THE INVENTION

The present invention is generally directed to combustion, and more specifically to a method of operating a main burner wherein the main combustion occurring therein is supported by a catalytic pilot that oxidizes a fuel rich mixture and a main burner for use therewith.

BACKGROUND

Power is generated in a gas turbine engine by the expansion of heated gases against a rotating turbine. To accomplish this heating and expansion a gas turbine has at least one combustor having at least one main burner positioned therein. The main burner combines a fuel and air into a fuel/air mixture and combusts the mixture thereby creating the expanding hot gases. Combustion of the mixture generally occurs by a flame mechanism.

A problem commonly associated with the operation of gas turbines employing a flame mechanism is that at high flame temperatures, particularly above 2800 degrees F., oxygen and nitrogen present in the air combine by a thermal formation mechanism to form pollutants such as NO and $NO_2$, collectively referred to as $NO_x$. In a gas turbine, temperatures of most common fuels combusting in air can easily exceed this value. Accordingly, it has been an objective of gas turbine combustion system designers to develop methods and associated apparatuses for combustion that produce reduced temperatures at or below 2800 degrees F., so that such thermal formation of $NO_x$ is limited.

Modern combustion methods employed in gas turbine combustors reduce flame temperatures, and thereby $NO_x$, by using excess air to create lean fuel/air mixtures, e.g. mixtures that contain more air than needed to fully combust all the fuel present. Quantitatively, the mixture has a fuel/air equivalence ratio less than one. The equivalence ratio is the ratio of the actual fuel/air ratio to the stoichiometric fuel/air ratio, where the stoichiometric coefficients are calculated for the reaction giving full oxidation products $CO_2$ and $H_2O$. An equivalence ratio greater than one defines a fuel-rich fuel/air mixture, and an equivalence ratio less than one defines a fuel-lean fuel/air mixture. For any given substantially premixed fuel/air mixture, the combustion temperature will be at its highest temperature when the fuel/air mixture being combusted has a fuel/air equivalence ratio of about one.

The more excess air added to and well mixed in a fuel/air mixture, the leaner the resulting fuel/air mixture becomes and the lower the flame temperature of that mixture. However, if too much excess air is added the resulting fuel/air mixture will become so lean that it will not homogeneously combust. In this situation, the mixture is said to have reached its lower flammability limit. Therefore, excess air to limit flame temperature can only be added to a well mixed fuel/air mixture until this limit is reached.

In order to obtain the benefits of lower flame temperatures in fuel/air mixtures, the fuel/air mixture being combusted must be substantially mixed. Typically, the lower the unmixedness the lower the $NO_x$ that will be produced. While unmixedness defines a continuum such that mixtures can only be categorized as being mixed to some degree, a "substantially premixed mixture" can be defined based on the fuel/air mixture's potential to produce a certain level of $NO_x$ when combusted within the context of acceptable $NO_x$ production based on existing environmental regulation. In other words, the mixture is mixed sufficiently to produce a level of $NO_x$ that will meet current environmental regulations.

Thus based on current environmental regulation, substantially premixed fuel/air mixtures are mixtures wherein the average variation of fuel/air ratio from the mean is less than about 20 percent of the mean value and more preferably in the range from about 10 percent to about 2 percent, with less than 2 percent being a practical minimum. Mean fuel/air ratio refers to the average fuel/air ratio as measured at various points in the region of interest. Variation from the mean refers to the magnitude of the difference between the mean and the measured fuel/air ratio at some single measured point, and the average variation from the mean is the average of all measured variations from the mean. For a combustible fuel/air mixture the region of interest is generally immediately prior to combustion.

In a combustor, the air stream and the fuel stream must form a fuel/air mixture prior to combustion. To mix two flowing fluid streams to form a single flowing stream, the individual streams must be brought into contact and travel some distance together. If mixing is done within a duct, the length of the duct will determine the degree of unmixedness. Generally speaking, the longer the duct the lesser the degree of unmixedness.

As a lean fuel/air mixture is made ever leaner but above the mixture's lower flammability limit, the rate of combustion associated with the mixture decreases, i.e. the flame is becoming less robust. In order to maintain the flame, the environment within the flame must be made ever more conducive to combustion, e.g. the flow velocity must be reduced, otherwise the flame could be blown out, much like one blows out a candle. In a gas turbine when the fuel/air mixture has been leaned to the point that the rate of combustion of the mixture is too low to sustain combustion under the existing conditions, the extinguishing of the flame by its environment is termed blowout. Flame anchoring, i.e. the ability to provide proper environmental conditions to support a flame, and flame stability thus become problematic for fuel-lean combustion.

The management of combustion within a gas turbine operating on lean fuel/air mixtures to avoid blowout and assure flame anchoring and stability is complex. Gas turbines are generally designed to operate at a given or peak condition, i.e. an optimum condition which is highly efficient. However, during startup or at other times, it may be desirable to operate at other, or off-peak, conditions. Therefore, a gas turbine must have the ability to transition from the peak condition to off-peak conditions. This ability to go from a peak to off-peak condition is generally referred to by those skilled in the art as the ability to turndown the gas turbine.

Turndown is accomplished by reducing the fuel supply to the combustor, thereby making the fuel/air mixture being combusted therein leaner. As the gas turbine at its peak condition is already operating with a fuel/air mixture that is quite lean to meet current environmental standards, when the fuel/air mixture is made ever leaner to achieve the desired off-peak operating condition, sustaining combustion within the combustor becomes ever more problematic. In some cases, turndown is simply insufficient to permit acceptable off-peak operation conditions.

To increase the ability of a gas turbine to turndown, pilots can be used to support combustion within the combustor. Specifically, the pilots are supporting what is termed main combustion. Pilots that use flames operate at very favorable fuel/air mixtures, which may even be at fuel/air ratios at or near 1.0, providing highly stable and high temperature flames. Initially, pilot emissions were a small percentage of the overall emissions from the gas turbine. Currently, however, gas turbines have main combustion occurring at such lean fuel/air mixtures that $NO_x$ discharge is acceptable, and it is the emissions from these flame based pilots that must be further reduced to reduce overall gas turbine $NO_x$ emissions.

Conventional catalytic pilots on the other hand are highly stable but operate at lower temperatures, because of catalyst material considerations, thereby producing less $NO_x$ than flame pilots. However, these lower temperatures hamper the ability of the catalytic pilot to support combustion of lean fuel/air mixtures.

Based on the foregoing, it is the general object of the present invention to provide a method and apparatus for use therewith to support main combustion that overcomes the problems and drawbacks of the prior art.

SUMMARY OF THE INVENTION

The method of combustion utilizes catalytic oxidation to support flame burning of a lean fuel/air mixture. In the method of the invention a first, second, and third air, and a first and second fuel are provided such that: the first fuel and first air have a fuel/air equivalence ratio greater than 1; the first fuel in combination with the first air and second air have a fuel/air equivalence ratio less than 1; and the second fuel and the third air have a fuel/air equivalence ratio less than 1.

The first fuel and first air are introduced into a first common area so the first fuel and first air can travel together and intermix to form a first mixture. The first mixture is then flowed over and brought in contact with a catalyst where the fuel in the first mixture is oxidized resulting in creation of a first reacted mixture and a heat of reaction. The first reacted mixture is then introduced to the second air in a second common area so the first reacted mixture and the second air travel together and intermix to form a second mixture. The second mixture is then combusted. Combusted as used herein means that the mechanism of burning is a flame. The second mixture, which is derived from the first fuel, the first air, and the second air, is lean because the constituents from which it is derived in combination are lean. It should be understood as explained above, the second mixture can not be so lean as to be below the lower flammability for the second mixture.

Simultaneously, the third air and the second fuel are introduced into a common area where the third air and second fuel travel together and intermix forming a third mixture. The third mixture is then combusted. The third mixture is also lean because the second fuel and third air from which the third mixture was derived have a fuel/air equivalence ratio less than 1. As with the second mixture, it is understood that the third mixture must have a fuel/air equivalence ratio above the lower flammability limit of the third mixture.

The method requires that the combusting second mixture be in contact with the combusting third mixture. The second mixture is combusted in contact with the third mixture when the two flames interact. In other words, the flames touch. It is preferred that the flame of the second mixture be substantially within the flame of the third mixture.

In an enhancement to the method, a heat of reaction generated during the catalytic reaction of the first mixture can be transferred into the second air. Dissipating excess heat into the second air stream can protect the catalyst used in the oxidation of the first fuel mixture, i.e. backside cooling the catalyst. Backside cooling a catalyst protects the catalyst and substrate on which it might be positioned from damage from the extreme temperatures generated in exothermic catalytic oxidation.

While the first, second and third airs are identified as separate airs; the airs could be from a common source. In addition while the first fuel and second fuel could be different, the two fuels preferably are the same.

When this method is applied to a gas turbine, the method permits a pilot to produce less $NO_x$ than other standard flame pilots, but also provides a flame that is generally equally robust to that of flame pilots to support the main combustion. It is preferred that the combustion of the second mixture support, i.e. pilot, the combustion of the third mixture. As such, the ratio of first fuel to second fuel should be less than about 1:1 but greater than about 1:19. Preferably, the ratio should be less than about 1:4 and greater than about 1:9. These ratios permit this method to be employed within current gas turbine designs.

A ratio greater than 1:9 is preferred because the pilot can provide significant stability to the main combustion with pilot emissions being a small percentage of the overall emissions. At ratios greater than 1:1, the flows through the pilot can disrupt main combustion and overall pilot size to accommodate the flows therethrough become problematic.

A main burner in one aspect that can employ the above method comprises a catalytic pilot comprised of a first duct and a main mixer disposed within an interior area of a housing with the main mixer in fluid communication with a second duct with both the first duct and the second duct having exits positioned relative one to the another such that the exits cooperate to position a flame emanating therefrom in contact. More specifically, the catalytic pilot is comprised of a catalytic reactor in fluid communication with the first duct that has a first entrance, a second entrance, and an exit. The first entrance and second entrance are positioned coincident one with the other, or the first entrance is spatially upstream. The third duct is in fluid communication with the second entrance.

The first and second ducts have geometry to permit mixing to occur. As indicated above, mixing requires some finite length of the duct regardless of other geometric considerations. This length is a critical parameter that must be sufficient to permit the degree of mixing required by the application. In the second duct a fuel and oxidizer is mixed, and the first duct a reacted mixture and another oxidant is mixed. In terms of the method above, the first air and first fuel are mixed in the first duct to form the first mixture, and the first reacted mixture and the second air are mixed in the second duct to form the second mixture.

Mixing of the fluids within the ducts can be accomplished by any means such as entrainment or swirling. As those skilled in the art will appreciate, some mixing methods will require additional structure, such as swirlers, in the duct and other mixing methods such as entrainment will not.

Preferably, the catalytic pilot is positioned within a passage defined by the main mixer. In some applications, it might be desirable to make the main mixer an annulus and position the catalytic pilot within the vacant center region concentric therewith. When the catalytic pilot and the main mixer are positioned in this manner, the exit from the catalytic pilot should be spatially downstream from the exit of the main mixer.

The catalytic reactor within the catalytic pilot can be of almost any design. As discussed above, an additional step in the method is the transfer of some of the heat of reaction into the second fluid. In terms of the catalytic reactor, this step can translate into a backside-cooled catalyst. Backside cooling of a catalyst occurs where a catalyst, i.e. substance that promotes the desired reaction, is positioned on just one side of a two sided substrate and the catalytic reactor is designed to permit a flow of a fluid over both sides. This structure permits the heat generated by the exothermic reaction of the fuel/air mixture on the surface of the substrate having the catalyst to be conducted through the substrate to the other side and transferred into the fluid flowing in contact therewith.

The method and main burner could be used within the combustor of a gas turbine as well as other devices such as heaters. While the invention is discussed in the more conventional terms of fuel/air, the invention should not be considered so limited as any fuel and associated oxidant could be used.

DETAILED DESCRIPTION

Figure 1:
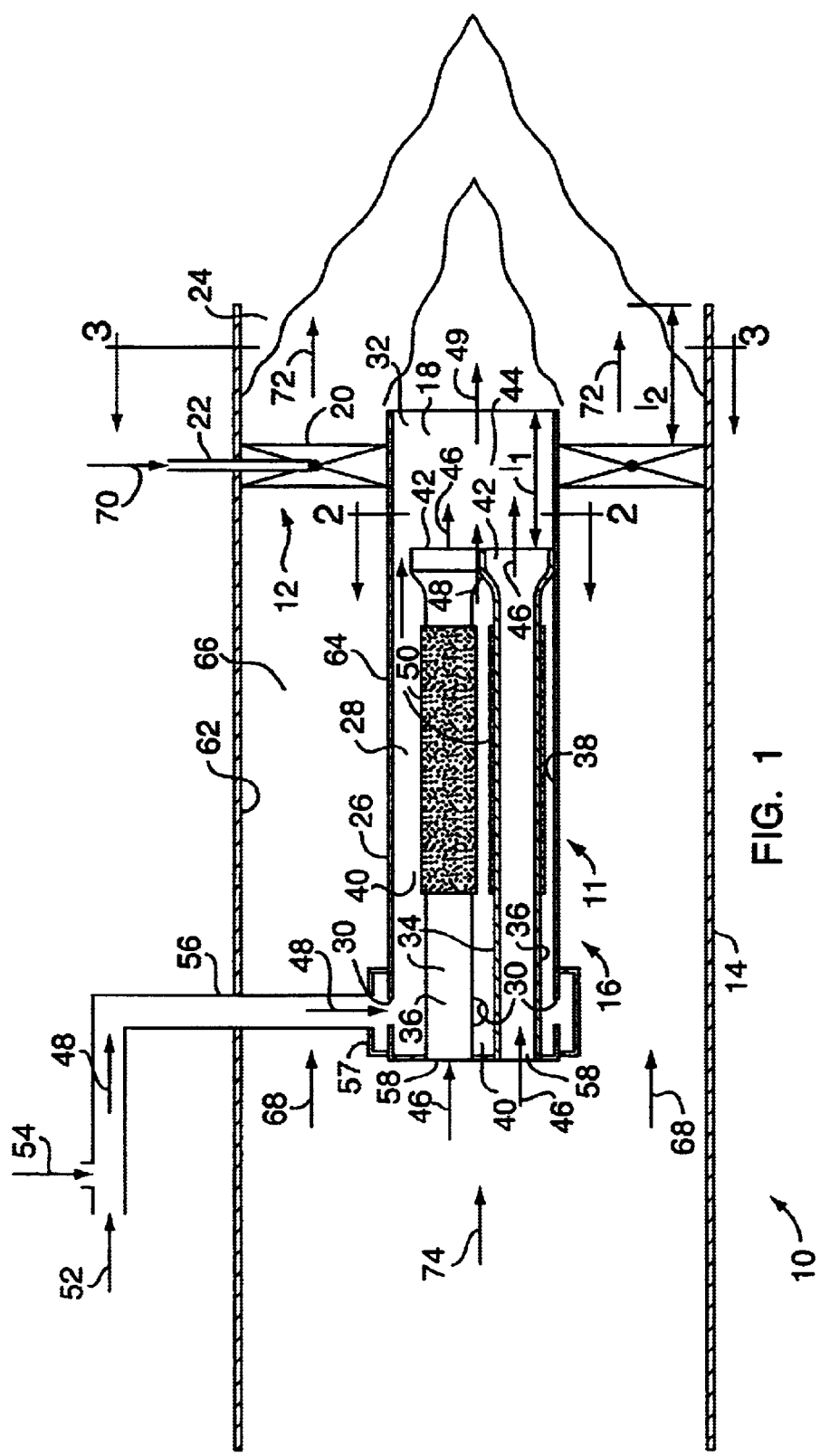
FIG. 1 is a schematic cross-section of a gas turbine main burner of the present invention.

As shown in FIG. 1, the main burner generally referred to by reference 10 comprises a catalytic pilot generally referred to by reference number 11 positioned within a main mixer generally referred to by reference number 12 that is positioned within a housing 14. The catalytic pilot 11 is comprised of catalytic reactor generally referred to by reference number 16 in fluid communication with a first duct 18. The main mixer 12 is comprised of a mixer 20 with an integral fuel injector 22 in fluid communication with a second duct 24. The first duct 18 and the second duct 24 are in fluid communication.

Figure 2:
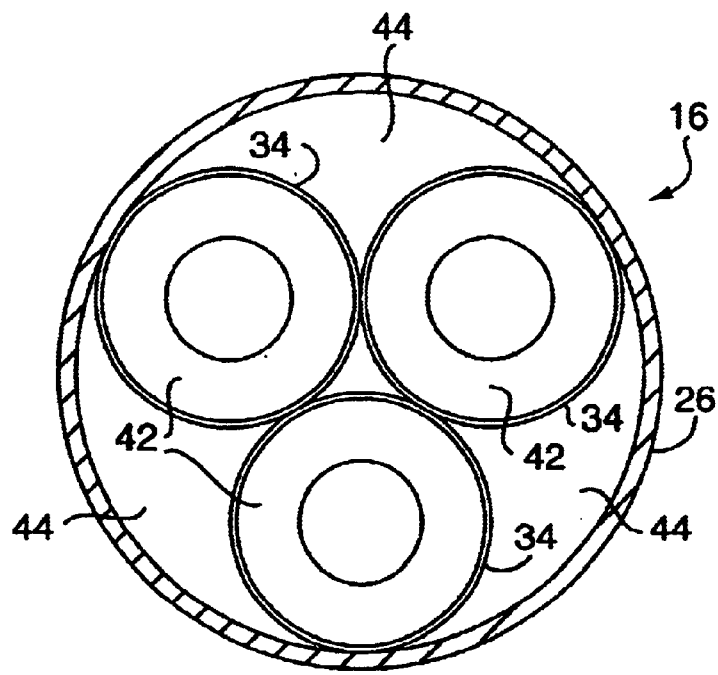
FIG. 2 is an end view of the catalytic pilot portion of the gas turbine main burner depicted in FIG. 1.

The catalytic pilot 11 is comprised of a housing 26 that defines an interior area 28 and an inlet 30 in fluid communication therewith. The interior area 28 defines an exit 32. Positioned within the interior area 28 is a plurality of tubes 34, each having an exterior surface 36. The housing 26 has an interior surface 38 that in cooperation with the exterior surfaces 36 defines a single flow channel 40. Each tube 34 has an exit 42. As shown in FIG. 2, the tube exits 42 cooperate to define an exit 44 from the single flow channel 40.

Continuing with FIG. 1, the inlet 30 is in fluid communication with the single flow channel 40. Positioned on the exterior surface 36 between the inlet 30 and the single flow channel exit 44 is a catalyst 50, such that a first mixture 48 enters the single flow channel 40 through the inlet 30 and passes over the catalyst 50 before exiting the single flow channel 40 through the exit 44. The catalyst 50 is application specific; however, in a gas turbine utilizing a hydrocarbon based fuel a precious metal based catalyst such as platinum or palladium, i.e. a catalyst having a platinum or palladium element whether individually or in compound, would be appropriate.

The single flow channel exit 44 and the tube exits 42 are in fluid communication with the first duct 18. The single flow channel exit 44 and the tube exits 42 are coincident with each other, i.e. in the same plane. The tube exits 42, however, can be spatially downstream from the single flow channel exit 44.

As shown in FIG. 2, the single flow channel exit 44 is subdivided into multiple openings, which are preferably discrete, with the openings interspersed around the tube exits 42. The multiple discrete openings subdivide the first reacted mixture as it exits the single flow channel exit 44 and permits the interspersal of these openings around the tube exits 42 thereby promoting more rapid mixing of the first reacted mixture 48 exiting the single flow channel 40 and the second air 46 exiting the tubes 34 within the first duct 18. The openings are defined by the outer surface of the tubes 34. In the preferred embodiment, flared ends of the tubes 34 position the tubes 34 within the housing 26; however, other structures such as a grid could be used.

Referring back to FIG. 1, the first duct 18 is defined by a portion of the interior surface 38 of the housing 26. The first duct 18 has a length $l_1$ that is non-zero and sufficient to permit the second air 46 exiting the tubes 34 and the first reacted mixture 48 exiting the single flow channel 40 through exit 44 to mix to a desired degree of unmixedness forming a second mixture 49, which exits the catalytic pilot 11 through the exit 32.

The inlet 30 is in fluid communication with a conduit 56. It is the conduit 56 through which the first mixture 48 flows into the single flow channel 40 such that the first mixture 48 exclusively enters the single flow channel 40 and not a tube 34. The first mixture 48 is comprised of first air 52 and first fuel 54 that has been injected therein. The first mixture 48 should be well mixed. Mixing can be accomplished by any means such as swirlers (not shown) or entrainment. As an option, a plenum 57 can be imposed between the conduit 56 and the inlet 30. When a plenum 57 is used, the plenum 57 should extend around the exterior surface 64 and there should be additional inlets 30 such that the first mixture 48 can enter the single flow channel 40 at multiple locations. The use of a plenum 57 allows for a better entering flow distribution of the first mixture 48 within the single flow channel 40.

The tubes 34, each of which have an entrance 58, are positioned such that the second air 46 exclusively enters the tubes 34, and does not enter the single flow channel 40. In the preferred embodiment, the tubes 34 penetrate the housing 26 such that the tube entrances 58 are not within interior area 28. Where the tubes 34 penetrate the housing 26, the penetration is sealed such that leakage is prevented from the single flow channel 40 around the tubes 34. This assures that the second air 46 will exclusively enter the tubes 34 and the first mixture 48 will exclusively enter the single flow channel 40.

Figure 3:
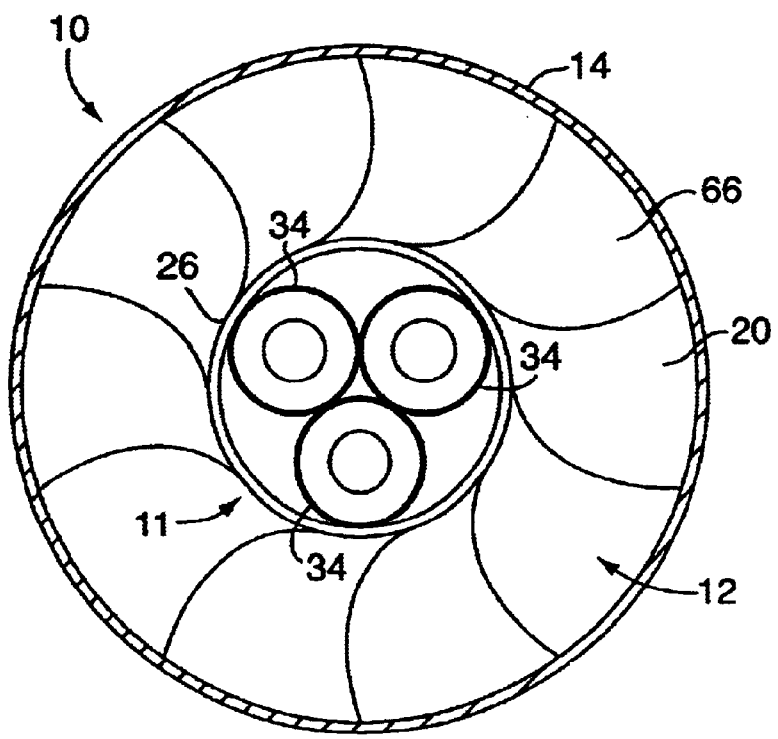
FIG. 3 is an end view of the gas turbine main burner depicted in FIG. 1.

The housing 14 has an inner surface 62 and the housing 26 has an exterior surface 64 that cooperate to define a region 66 wherein the main mixer 12 is positioned. In the preferred embodiment, the main mixer 12 is comprised of a mixer 20 with an integral fuel injector 22 in fluid communication with the second duct 24. As shown in FIG. 3, the mixer 20 is a swirler that fills the cross-section of the region 66. Other main burners such as those where the mixer and fuel injector are not integrated are considered within the scope of the invention. It is also not a requirement of the present invention that the mixer 20 completely fill the cross-section of the region 66.

Continuing with FIG. 1, the second duct 24 must be of sufficient length $l_2$ to permit mixing of a third air 68 with a second fuel 70. The length $l_2$ is measured from where the third air 68 and the second fuel 70 are brought into contact to the point at which a third mixture 72 is created, which has the degree of unmixedness desired. Fluids mixing within the first duct 18 and the second duct 24 must be isolated one from the other, until of course the fluids are combusted.

While a first air 52, a second air 46 and a third air 68 have been discussed, it is understood that these airs could be derived from a single primary air 74. Similarly, it is understood that the first fuel 54 and the second fuel 70 could both be obtained from the same fuel source.

In the method of the current invention as applied to the above main burner 11, a first air 52, a second air 46, and third air 68 as well as a first fuel 54 and second fuel 70 are provided. The first fuel 54 and the first air 52 are proportioned such that if traveling together and intermixed a first mixture 48 would be formed having a fuel/air equivalence ratio greater than 1.0. The first fuel 54, the first air 52, and the second air 46 are proportioned such that if traveling together and intermixed a second mixture 49 would be formed having a fuel/air equivalence ratio less than 1.0. Finally, if the second fuel 70 and the third air 68 are proportioned such that if traveling together and intermixed a third mixture 72 would be formed having a fuel/air equivalence ratio less than 1.0.

The first fuel 54 and the first air 52 are introduced into a first common area, such as a conduit 56 where the first fuel 54 and the first air 52 travel together and intermix to form the first mixture 48. The first mixture 48 is then oxidized in the presence of the catalyst 50 as the first mixture flows over and comes in contact therewith producing the first reacted mixture 48. In the case of a gas turbine employing standard hydrocarbon fuels, the oxidation will be exothermic generating a heat of reaction.

The first reacted mixture 48 is then introduced into a second common area such as the first duct 18, which also serves as a post mixing chamber for the cooling air flow 60 and the first reacted mixture 48, along with the second air 46 where the first reacted mixture 48 and the second air 46 travel along and intermix to form the second mixture 49. To form the second mixture 49, the first reacted mixture 48 must not auto-ignite upon exiting the single flow channel exit 44 and contacting the second air 46. Whether the first reacted mixture 48 will auto-ignite upon contact with the second air 46 is application specific and dependent upon such factors as the temperature and flow velocity of the first reacted mixture 48. For a more complete discussion see U.S. patent application Ser. No. 09/527,708 titled "Method and Apparatus for a Fuel Rich Catalytic Reactor" that is assigned to the same assignee as the present application, namely Precision Combustion, Inc., and the disclosure of which is incorporated herein in its entirety.

The second mixture 49 is then combusted. Depending upon the conditions, the second mixture 49 may have to be ignited to begin combustion. The first duct 18 while depicted as being generally cylindrical, may in certain situations be non-cylindrical and even have a decreasing cross-section. A decreasing cross-section could assist in increasing the velocity of the first reacted mixture 48 and the second air 46 as the two mix to form the second mixture 49, thereby decreasing potential of an autoignition event within the first duct 18. If the cross-section is decreased as described above, a flame stabilizer such as a dump might be required at the end of the decreasing cross-section to anchor the combustion of the second mixture 49.

Simultaneously with the above, the third air 68 and the second fuel 70 are introduced into a common area of mixer 20 so that the third air 68 and the second fuel 70 travel together and intermix to form the third mixture 72. The third mixture 72 is then combusted. The combusting second mixture 49 is combusted in contact with the combusting third mixture 72.

As those skilled in the art of combustion engineering will appreciate, adjustment of the fuel/air equivalence ratios within the parameters discussed above will determine the amount of $NO_x$ produced by the main burner. As discussed above, $NO_x$ formation occurs at elevated temperatures and fuel/air equivalence ratios can be adjusted to limit the resulting combustion temperatures resulting from the second and third mixtures. To achieve these $NO_x$ reductions however, the mixtures must be highly mixed. The first and second ducts must be of sufficient lengths to permit the desired degree of mixing. Generally, the second fuel and third air, and the first reacted mixture and the second air must have an unmixedness no greater than about 20 percent with a range of between 2 and 10 percent being desired. Above these limits, the mixtures will not be burning as substantially premixed mixtures thus $NO_x$ reductions will be minimized by significant high-temperature combustion within the mixture.

An additional consideration is the velocity of the second fuel and third air and the first reacted mixture and second air through the main mixer and the catalytic pilot, respectively. These mixtures must travel at sufficient velocity to prevent flashback, i.e. a flame traveling toward the fuel source of the flame, in this case entering the first and/or second duct. Velocity is also critical for the second and third mixtures. The velocity of these mixtures must allow for stable combustion. These velocities and calculations thereof are well within the knowledge and skill of those in combustion engineering.

As an option, a portion of the heat of reaction can be transferred into the second air 46. The heat of reaction raises the temperature of the first reacted mixture 48. If some of this heat of reaction is transferred to the second air 46, the temperature of the second air 46 will be increased. As disclosed in U.S. patent application Ser. No. 09/527,708, the incorporation of the heat of reaction into the second air 46 will lower overall $NO_x$ formation of the catalytic pilot.

While preferred embodiments have been shown and described, various modification and substitutions may be made without departing from the spirit and scope of the invention. Accordingly, it is understood that the present invention has been described by way of example, and not by limitation.

What is claimed is:

1. A method of combustion comprising the steps of:
   providing a first, second, and third oxidant;
   providing a first and second fuel, the first, second and third oxidants and the first and second fuels being of such proportions that
   the first fuel and the first oxidant have a fuel/oxidant equivalence ratio greater than 1.0,
   the first fuel in combination with the first and second oxidant have a fuel/oxidant equivalence ratio less than 1.0, and
   the second fuel and third oxidant have a fuel/oxidant equivalence ratio less than 1.0;
   introducing the first oxidant and the first fuel into a first common area so the first oxidant and the first fuel travel together and intermix to form a first mixture;
   oxidizing a portion of the first fuel with the first oxidant within the first mixture by flowing the first mixture over and in contact with a catalyst thereby generating a heat of reaction and a first reacted mixture;
   ducting the first reacted mixture and separately ducting the second oxidant into a second common area so the first reacted mixture and the second oxidant travel together and intermix to form a second mixture;

combusting the second mixture;

introducing the third oxidant and the second fuel into a third common area so that the third oxidant and the second fuel travel together and intermix to create a third mixture; and combusting the third mixture in contact with the combusting second mixture.

2. The method of claim 1 wherein after the step of generating a heat of reaction, the method includes having the further step of transferring a portion of the heat of reaction into the second oxidant.

3. The method of claim 2 wherein in the step of introducing the first reacted mixture and the second oxidant the first reacted mixture and the second oxidant are intermixed such that second mixture is substantially premixed.

4. The method of claim 3 wherein in the step of introducing the third oxidant and the second fuel the second fuel and the third air are intermixed such that the third mixture is substantially premixed.

5. The method of claim 1 wherein in the step of providing the first, second, and third oxidant the first oxidant, second oxidant, and third oxidant are flows divided from a primary oxidant.

6. The method of claim 1 wherein in the step of providing a first and second fuel the first fuel is of a first type and second fuel is of a second type, the first and second type being the same.

7. The method of claim 1 wherein in the step of providing a first and second fuel the first fuel and second fuel are in a ratio less than about 1:1 and greater than about 1:19.

8. The method of claim 7 wherein the ratio is less than about 1:4 and greater than about 1:9.

9. The method of claim 1 wherein in the step of providing a first, second, and third oxidant the oxidant comprises oxygen.

10. The method of claim 9 wherein the oxidant comprises air and in the step of providing a first and second fuel the first and second fuels are a hydrocarbon.

11. A main burner comprising:

a housing defining an interior area;

a main mixer for introducing a fuel and an oxidant, the main mixer having an exit and being disposed in the interior area;

a first duct defining a chamber and having an exit, the chamber of the first duct in fluid communication with the main mixer exit, the first duct having a length that permits the fuel and the oxidant to mix therein creating a fuel/oxidant mixture;

a catalytic pilot comprising
  a catalytic reactor having an exit and a catalyst positioned therein for oxidizing a first mixture in the presence of the catalyst creating a reacted mixture, and
  a second duct defining a chamber and having a first entrance, a second entrance, and an exit, the first entrance being coincident with or relatively upstream of the second entrance, the first entrance in fluid communication with the catalytic reactor exit, and
  a third duct having an exit in fluid communication with the second entrance for introducing an other oxidant into the chamber of the second duct, the second duct having a length that permits the reacted mixture and the other oxidant to be mixed therein creating a reacted/other oxidant mixture, the chamber of the second duct being isolated from the chamber of the first duct whereby the reacted mixture and the other oxidant flow exclusively in the second duct and the fuel and the oxidant flow exclusively in the first duct; and the first duct exit and the second duct exit being positioned relative one to another such that a first flame resulting from the fuel/oxidant mixture is supported by a second flame resulting from the reacted/other oxidant mixture.

12. The main burner of claim 11 wherein the main mixer defines a passage extending therethrough, and the catalytic pilot is positioned therein.

13. The main burner of claim 11 wherein the main mixer defines a passage extending therethrough, and the second duct is positioned therein.

14. The main burner of claim 11 wherein the first duct length is sufficient to permit premixing of the fuel and oxidant.

15. The main burner of claim 14 wherein the first duct has a cross-section that tapers in the direction of flow.

16. The main burner of claim 14 wherein the second duct length is sufficient to permit premixing of the reacted mixture and other oxidant.

17. The main burner of claim 11 wherein the catalytic reactor comprises a substrate having a first and second side and a catalyst, the catalyst positioned on the first side and the first side isolated from the second side whereby the first mixture will flow over the first side exclusive of the second side and the other oxidant will flow over the second side exclusive of the first side.

18. The main burner of claim 17 wherein the catalytic reactor has a housing defining an interior area and an inlet adapted to allow the first mixture to pass therethrough, the inlet being in fluid communication with the interior area; a plurality of tubes positioned in the interior area, each defining an inlet positioned to receive during operation the other oxidant exclusive of the first mixture and an exterior surface and a passage, the passages collectively defining the third duct; the plurality of tubes and the interior area cooperating to define a flow channel through which during operation the first mixture exclusive of the other oxidant will flow; and a catalyst positioned with the flow channel on the exterior surface of at least one tube.

19. The main burner of claim 18 wherein the second duct exit is spatially downstream of the main mixer exit based on the normal flow of the fuel therethrough.

20. The main burner of claim 18 wherein the catalytic reactor further comprises a plenum in fluid communication with the flow channel.

21. The main burner of claim 20 wherein each tube has an exit and the exits are flared whereby the flares secure the tubes within the housing.

22. The main burner of claim 11 wherein the length of the first duct is sufficient to permit mixing such that the second mixture has an unmixedness less than 20 percent.

23. The main burner of claim 22 wherein the length of the second duct is sufficient to permit mixing such that the third mixture has an unmixedness less than about 20 percent.

24. The main burner of claim 23 wherein the unmixedness of the second mixture and first mixture is less than about 10 percent and greater than about 2 percent.

* * * * *